Feb. 12, 1929.
A. L. SHAW
1,701,733
COAL CONVEYER
Filed April 27, 1927　　5 Sheets-Sheet 1
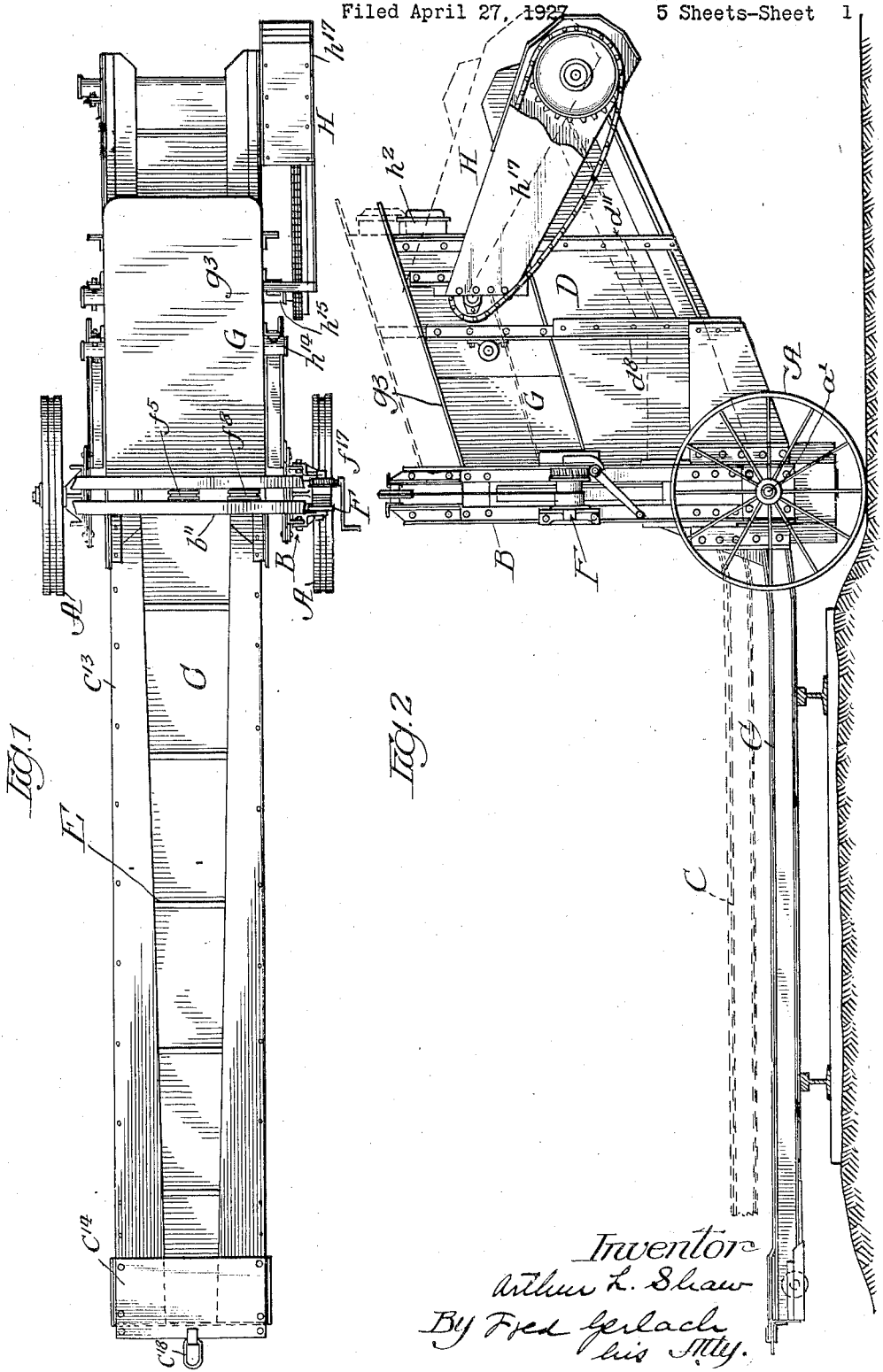

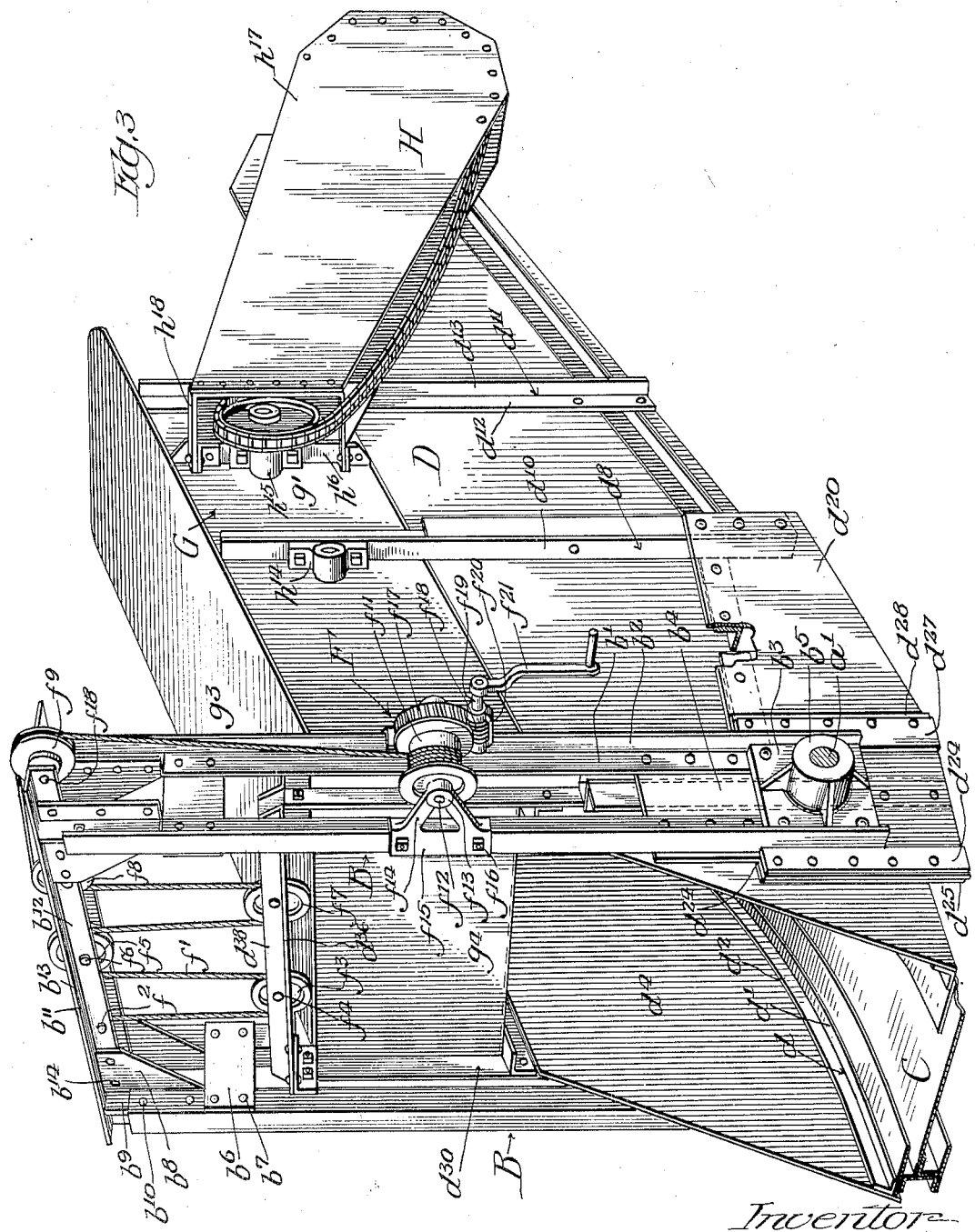

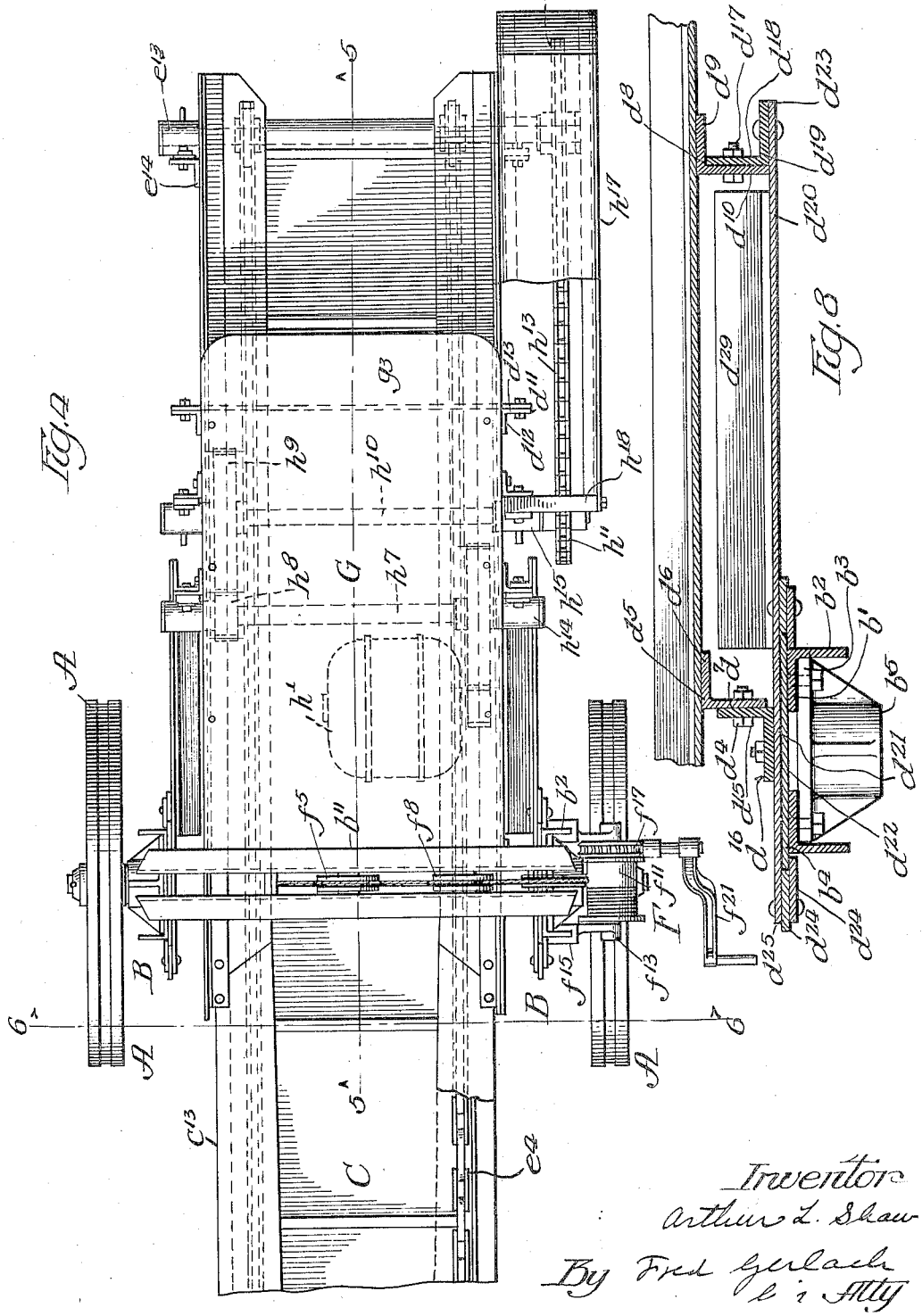

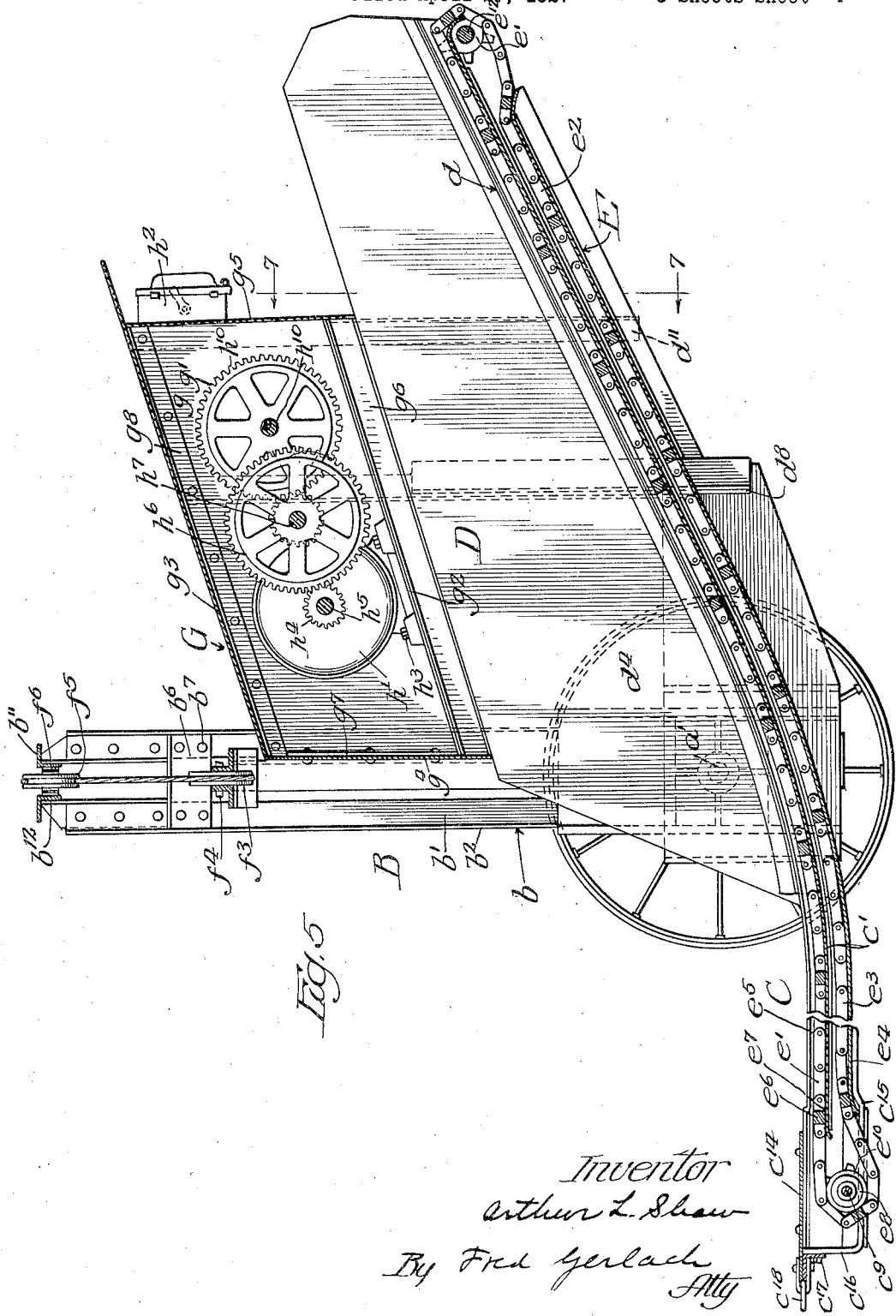

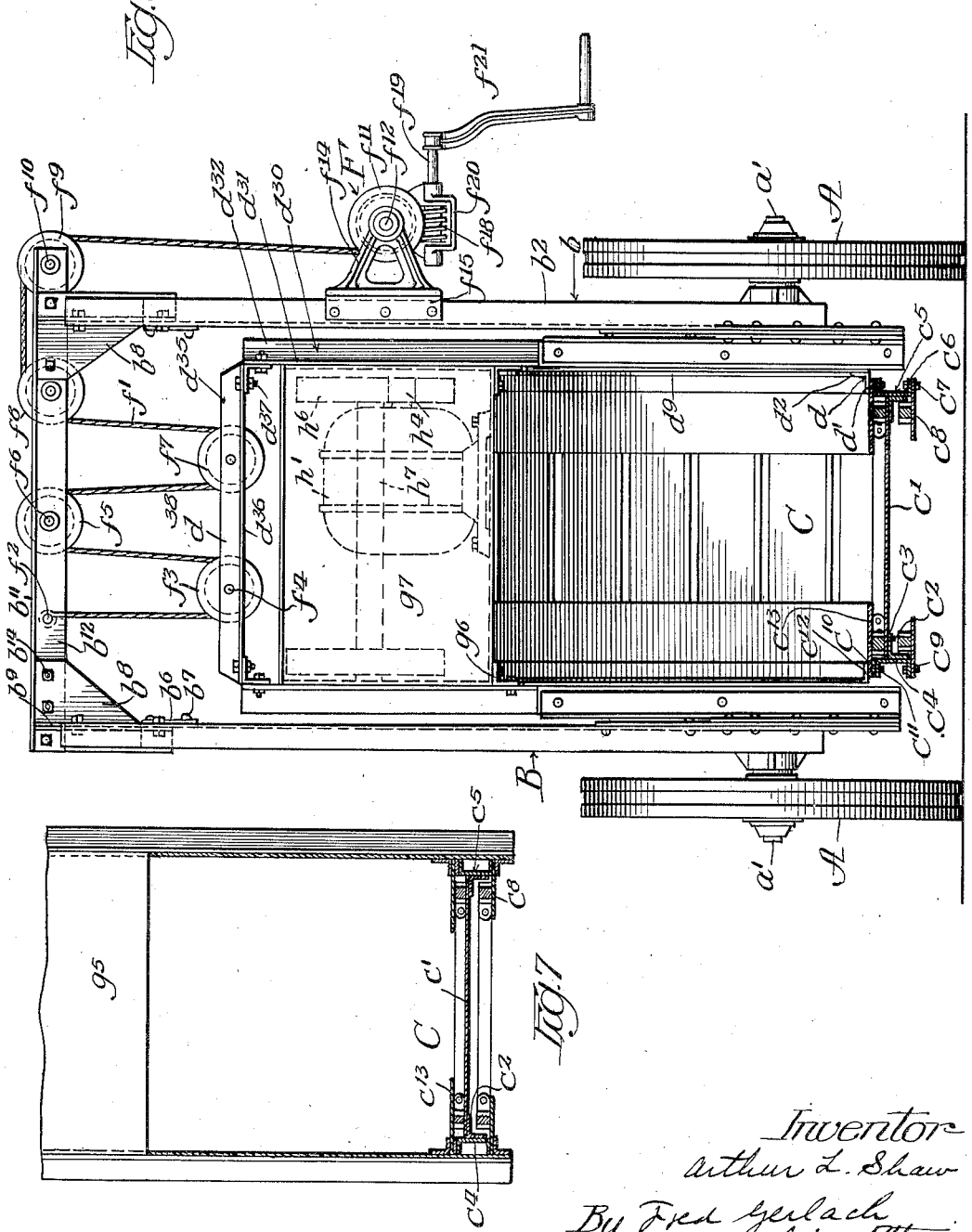

Patented Feb. 12, 1929.

1,701,733

UNITED STATES PATENT OFFICE.

ARTHUR L. SHAW, OF CHICAGO, ILLINOIS, ASSIGNOR TO CHICAGO AUTOMATIC CONVEYOR CO., OF CHICAGO, ILLINOIS, A CORPORATION OF ILLINOIS.

COAL CONVEYER.

Application filed April 27, 1927. Serial No. 186,858.

The invention relates to coal conveyers and more particularly to portable conveyers which are used in connection with the unloading of railroad coal cars and comprise a pair of supporting wheels, a horizontally extending conveyer unit projecting forwardly of the wheels and adapted to rest upon the railroad tracks beneath the coal chute or drop of the car, an upwardly inclined conveyer unit projecting rearwardly of the wheels and adapted to discharge the coal onto a wagon, truck or another conveyer, and a motor driven endless conveyer for the units.

In conveyers of this character it has heretofore been the practice to support the motor and power transmission gearing for the endless conveyer beneath the upwardly inclined conveyer unit. This arrangement has proved to be objectionable because the conveyer does not balance properly and consequently it cannot be wheeled readily from one place to another. Additionally the inclined reach of the endless conveyer is caused to be arranged at such an angle that the coal is apt to tumble back down the endless conveyer. One object of the present invention is to provide a coal conveyer of the aforementioned type in which the motor and power transmission gearing are so positioned that the conveyer is properly balanced and the inclined reach of the endless conveyer extends at a relatively small angle.

Another object of the invention is to provide a coal conveyer which embodies new and improved means for raising and lowering the conveyer units relatively to the carrying-wheels so that the horizontal unit may be adjusted to lay across the tracks which support the car to be unloaded.

Another object of the invention is to provide a portable coal conveyer which is efficient in operation and is of new and improved construction.

Other objects will be apparent from a consideration of the following detailed description.

The invention consists in the several novel features hereinafter set forth and more particularly defined by the claims at the conclusion hereof.

In the drawings which accompany and form a part of this specification or disclosure and in which like characters of reference denote corresponding parts throughout the several views, Fig. 1 is a plan of a coal conveyer embodying the invention. Fig. 2 is a side elevation. Fig. 3 is a perspective, the horizontal conveyer unit being broken away and the carrying-wheels being omitted for purposes of illustration. Fig. 4 is an enlarged plan. Fig. 5 is a vertical section taken on the line 5—5 of Fig. 4. Fig. 6 is a transverse section taken on the line 6—6 of Fig. 4. Fig. 7 is a section taken on the line 7—7 of Fig. 5. Fig. 8 is an enlarged section of one of the sliding connections between the inclined conveyer unit and the frame which is mounted on the axles for the carrying-wheels.

The invention is exemplified in a coal conveyer of the portable type which may be wheeled around from car to car and consists of a pair of carrying-wheels A which support and are rotatable on stub-axles $a^1$; a vertically extending frame B which is mounted on the stub-axles; a horizontally extending conveyer unit C which extends between the carrying-wheels and projects forwardly therefrom; an upwardly inclined conveyer unit D which forms a continuation of the conveyer unit C, projects rearwardly from the carrying-wheels and is connected to the frame B to slide vertically; an endless conveyer E which has a horizontal portion $e^1$ operating in the unit C and an upwardly inclined portion $e^2$ operating in the unit D; mechanism F for raising and lowering the conveyer units relatively to the frame B and carrying-wheels A; a housing G which is mounted above the conveyer unit D; and mechanism H which is disposed in the housing G and is connected to drive the endless conveyer.

Frame B is a rigid structure and comprises two pairs of vertically extending angle bars $b$ each of which consists of an inner leg $b^1$ and an outer leg $b^2$. Each pair of bars are spaced apart and have their lower ends disposed between a rectangular plate $b^3$ and an elongated guide plate $b^4$. Rivets $b^5$ extend through the plates and the inner legs $b^1$ of the angle bars to rigidly connect them together. Plates $b^3$ are provided on their outer faces with bosses $b^5$ in which the stub-axles $a^1$ are fixed. The front and rear margins of guide plates $b^4$ extend forwardly and rearwardly of the outer legs $b^2$ of the angle bars respectively. Each pair of angle bars $b$ are connected together at their upper ends by a plate $b^6$ which is secured by bolts $b^7$ to the inner legs $b^1$ of the bars. Bracket plates $b^8$ having flanges $b^9$ which extend at right angles relatively thereto are connected to the upper ends of the angle bars respectively by bolts $b^{10}$. The latter extend through the flanges $b^9$ and the inner legs of the angle bars. A pair of transversely extending angle bars $b^{11}$ connect the two pairs of bars at their upper ends. These angle bars $b^{11}$ are spaced apart and each consists of a lower leg $b^{12}$ and an upper leg $b^{12}$ which is adapted to rest upon the upper edges of two of the bracket plates $b^8$. Angle bars $b^{11}$ are secured to the bracket plates by bolts $b^{14}$ which extend through the plates and the lower legs $b^{12}$.

The units C and D are continuations of each other and comprise a carrier plate $c^1$ which supports the upper reach of the portions $e^1$ and $e^2$ of the endless conveyer E. The front end of plate $c^1$ projects forwardly of frame D and is horizontal. The central portion of the plate extends between the two pairs of angle bars $b$ and is bent on a relatively large arc so that the rear end which projects rearwardly of the frame is inclined upwardly at a relatively small angle. The side margins of plate $c^1$ rest upon a pair of angle bars $c^2$. Each of these angle bars consists of an upper leg $c^3$ which is welded to plate $c^1$, and a lower leg $c^4$. A pair of channel beams $c^5$ have the central portion of their webs $c^6$ welded to legs $c^4$ of the angle bars $c^2$. The bottom flanges $c^7$ of the beams extend outwardly and have strips $c^8$ secured by bolts $c^9$ to their bottom faces. Strips $c^8$ extend inwardly and support the lower reach of the portions $e^1$ and $e^2$ of the endless conveyer. The upper flanges $c^{10}$ of the beams extend outwardly and are secured by bolts $c^{11}$ to spacers $c^{12}$ and strips $c^{13}$. Angle bars $c^2$, beams $c^5$, spacers $c^{12}$, and strips $c^8$ and $c^{13}$ are co-extensive with and are shaped to correspond to plate $c^1$. Strips $c^{13}$ extend inwardly so as to cover the margins of the endless conveyer E and are connected at their front ends to a transversely extending plate $c^{14}$. A pair of brackets $c^{15}$ have their rear ends secured to the bottom faces of flanges $c^7$ at the front ends of the channel beams. The front ends of these brackets extend upwardly, as at $c^{16}$, and are riveted to a transversely extending angle bar $c^{17}$ which is secured to the front margin of plate $c^{14}$. A ring $c^{18}$ for use in pulling the conveyer from one place to another is connected to the front end of the conveyer by a U-shaped clip $c^{19}$ which is bolted to plate $c^{14}$ and the angle bar $c^{17}$.

The curved and upwardly inclined portions of strips $c^{13}$ have their outer margins welded to a pair of angle bars $d$. Each of the latter consists of an inwardly extending leg $d^1$ and an upwardly extending leg $d^2$ which is welded to the lower margin of a member $d^4$. Members $d^4$ form sides for the conveyer unit D and prevent the coal from falling over the sides of the inclined portion $e^2$ of the endless conveyer. Vertically extending angle bars $d^5$, $d^8$, and $d^{11}$ are secured to the outer face of each member $d^4$. Bars $d^5$ are disposed adjacent the front ends of members $d^4$ and each consists of an inner leg $d^6$ which is riveted to member $d^4$ and an outer leg $d^7$ which is secured by bolts $d^{14}$ to the inner leg $d^{15}$ of an angle bar $d^{16}$. Bars $d^8$ are disposed adjacent the central portions of members $d^4$ and each consists of an inner leg $d^9$ which is riveted to member $d^4$ and an outer leg $d^{10}$ which is secured by bolts $d^{17}$ to the inner leg $d^{18}$ of an angle bar $d^{19}$. Bars $d^{11}$ are disposed between the rear ends of members $d^4$ and bars $d^8$ and each consists of an inner leg $d^{12}$ which is riveted to member $d^4$, and an outer leg $d^{13}$. The upper and lower ends of bars $d^5$, $d^8$ and $d^{11}$ project beyond the upper and lower margins of members $d^4$ respectively. A pair of auxiliary members $d^{20}$ are disposed adjacent the outer faces of members $d^4$. These members $d^{20}$ are secured at their front ends to the outer legs $d^{21}$ of angle bars $d^{16}$ by bolts $d^{22}$. The rear ends of members $d^{20}$ are riveted to the outer legs $d^{23}$ of angle bars $d^{19}$. Each member $d^{20}$ is slidably connected to one end of the guide plates $b^4$ so that the conveyer units may be raised or lowered relatively to frame B and the carrying-wheels. Each connection comprises a pair of vertically extending shoe forming strips $d^{24}$ and $d^{25}$ which are riveted to the front margin of members $d^{20}$ and are staggered so as to form a recess $d^{26}$ for receiving the front margin of guide plate $b^4$; and a pair of shoe forming strips $d^{27}$ and $d^{28}$ which are riveted to the central portion of member $d^4$ and are staggered so as to form a recess for receiving the rear margin of the guide plate. Members $d^{20}$ are reinforced by a pair of longitudinally extending angle bars $d^{29}$ which are riveted to the inner faces of said members. A pair of vertically extending angle bars $d^{30}$ which consist of inner legs $d^{31}$ and outer legs $d^{32}$ are rigidly secured to the upper ends of angle bars $d^5$ by rivets which extend through the legs $d^{32}$ and $d^7$. An angle bracket $d^{33}$ is connected to the upper end of each bar $d^{30}$ by a bolt $d^{34}$ which extends through one arm of the bracket and leg $d^{31}$ of the bar. A pair of transversely extending angle bars $d^{35}$ connect the upper ends of bars $d^{30}$ together. These bars $d^{35}$ are spaced apart and each consists of a lower leg $d^{36}$ which is secured at its ends to the upper arms of brackets $d^{33}$ by bolts $d^{37}$, and upper legs $d^{38}$. Bars $d^{35}$ are suspended by the raising and lowering mechanism hereinafter described.

The endless conveyer E comprises a pair of sprocket chains $e^3$ which consists of links $e^4$ and pivot-pins $e^5$. The upper reaches of the chains are supported by the outer marings of plate $c^1$ and are disposed beneath strips $c^{13}$ so that they will not be in contact with the coal. The lower reaches of the chains are supported by strips $c^8$. Drag bars $e^6$ for moving the coal rearwardly along the plate $e^1$, when the conveyer E is operated, extend between the chains. These drag bars are provided at their ends with brackets $e^7$ which are connected to the pivot-pins $e^5$. At the front end of the conveyer, the chains extend around a drum $e^8$ which is fixed to a shaft $e^9$. The ends of the latter are rotatably mounted in bearing blocks $e^{10}$ which are secured to the brackets $c^{15}$. At the rear or discharge end of the conveyer the sprocket chains extend around sprockets $e^{11}$ which are fixed to a shaft $e^{12}$ which is driven by mechanism H. The ends of shaft $e^{12}$ extend through members $d^4$ and are rotatably mounted in bearing blocks $e^{13}$. The latter are secured to angle brackets $e^{14}$ which are riveted to the outer faces of members $d^4$.

The mechanism F for raising and lowering the conveyer units C and D so that unit C may be adjusted to lay upon railroad tracks, as shown in Fig. 2, comprises a cable $f^1$. This cable has one end anchored to a bolt $f^2$ which extends between and is secured to the lower legs $b^{12}$ of angle bars $b^{11}$. From bolt $f^2$ the cable extends downwardly and around a pulley $f^3$ which is carried by the angle bars $d^{35}$ of the conveyer unit D. This pulley is rotatably mounted on a pin $f^4$ which extends between and is secured to the upper legs $d^{38}$ of bars $d^{35}$. From pulley $f^3$ the cable extends upwardly and around a pulley $f^5$ which is carried by the angle bars $b^{11}$ of the frame B. Pulley $f^5$ is rotatably mounted on a pin $f^6$ which extends between and is secured to the lower legs $b^{12}$ of bars $b^{11}$. From pulley $f^5$ the cable extends downwardly and around a pulley $f^7$ and then upwardly and around a pulley $f^8$. These last-mentioned pulleys $f^7$ and $f^8$ are carried by bars $d^{35}$ and $b^{11}$ respectively in a similar manner to pulleys $f^3$ and $f^5$. From pulley $f^8$ the cable extends outwardly and over a sheave $f^9$ and then downwardly and around a drum $f^{11}$. Sheave $f^9$ is rotatably mounted on a pin $f^{10}$ which is secured to the legs $b^{12}$ of bars $b^{11}$. Drum $f^{11}$ is mounted on a shaft $f^{12}$. The ends of the latter are rotatably mounted in bearings $f^{13}$ which are formed integral with brackets $f^{14}$. These brackets have inwardly extending flanges $f^{15}$ which are secured by bolts $f^{16}$ to the outer legs $b^2$ of one of the pairs of angle bars $b$. Drum $f^{11}$ is rotated so as to wind or unwind the cable, by a worm gear $f^{17}$ which is driven by a worm $f^{18}$. The latter is fixed to a shaft $f^{19}$ which is mounted in a bearing bracket $f^{20}$ and is operated by a crank $f^{21}$. By turning drum $f^{11}$ so as to wind the cable thereon, the pulley end of the cable will be shortened so as to raise the conveyer units C and D. By reversing the rotation of the drum the pulley end will be lengthened so as to lower the units. A characteristic of this specific mechanism is that the conveyer units may be easily raised or lowered.

The housing G for mechanism H extends rearwardly and slightly upwardly from frame B and comprises a pair of sides $g^1$, a bottom $g^2$, a top $g^3$, a front $g^4$, and a back $g^5$. Sides $g^1$ are riveted to the upper ends of angle bars $d^5$, $d^8$ and $d^{11}$ and form continuations of members $d^4$. The front and rear ends of the sides terminate adjacent bars $d^5$ and $d^{11}$ respectively. Bottom $g^2$ and front $g^4$ are riveted to pairs of angle bars $g^6$ and $g^7$ which are secured to the lower and front margins of sides $g^1$ respectively. Top $g^3$ is connected to a pair of angle bars $g^8$ which are secured to the upper margins of sides $g^1$ by screws or any other suitable means which may be readily withdrawn, so that the top may be removed for access to mechanism H. Back $g^5$ is riveted to the outer legs $d^{13}$ of angle bars $d^{11}$. By disposing housing G as set forth the mechanism H balances the conveyer so that it is readily movable from place to place. Furthermore the housing does not interfere with the conveyer unit D. This permits the latter to be inclined at a relatively small angle so that the coal will not tumble back down portion $e^2$ of the endless conveyer.

Mechanism H for operating the endless conveyer comprises an electric motor $h^1$ which is connected to a switch box $h^2$ and is secured by bolts $h^3$ to the bottom $g^2$ of housing G; a pinion $h^4$ which is fixed to the rotor shaft $h^5$ of the motor; a gear $h^6$ which meshes with and is driven by pinion $h^5$ and is keyed to a shaft $h^7$; a pinion $h^8$ which is keyed to shaft $h^7$; a gear $h^9$ which meshes with and is driven by pinion $h^8$ and is keyed to a shaft $h^{10}$; a sprocket $h^{11}$ which is keyed to one end of shaft $h^{10}$; and a sprocket $h^{12}$ which is keyed to one end of shaft $e^{12}$ and is driven from sprocket $h^{12}$ by an endless chain $h^{13}$. Switch box $h^2$ is mounted on the outer face of the back $g^5$ of the housing, and is adapted to be connected to any suitable source of current. The ends of shaft $h^7$ extend through the sides $g^1$ and are rotatably mounted in a pair of bearing brackets $h^{14}$ which are bolted to the outer legs $d^{10}$ of the angle bars $d^8$. The outer ends of shaft $h^{10}$ extend through the sides $g^1$ and are rotatably mounted in a pair of bearing brackets $h^{15}$ which are bolted to a pair of angle bars $h^{16}$. The latter are riveted to the outer faces of sides $g^1$. Sprockets $h^{11}$ and $h^{12}$ and chain $h^{13}$ are inclosed by a housing plate $h^{17}$ which is supported by arms $h^{18}$. These arms are riveted to angle brackets $h^{19}$ which are secured to bars $h^{16}$.

The operation of the conveyer is as follows: First, the conveyer is wheeled adjacent the coal car to be unloaded. Crank $f^{21}$ is then operated to raise the conveyer units C and D until unit C is high enough to clear the tracks under the car. The conveyer is then moved to bring unit C across the tracks and directly under the chute or drop of the car. Crank $f^{21}$ is then operated in the opposite direction to lower the units until unit C rests upon the tracks. The chute or drop is then opened, which causes the coal to drop upon the carrier plate $c^1$. The switch box $h^2$ is then connected to a line and the switch closed. This operates the motor which operates the endless conveyer through the mechanism H. As the drag bars $e^6$ come into contact with the coal they drag it rearwardly over plate $c^1$ and up the inclined portion $e^2$ of the conveyer where it is discharged onto a wagon, truck or another conveyer. After the car has been emptied, the units are raised clear of the tracks and the conveyer is wheeled away.

Although reference has been made throughout the specification to the conveying of coal, it will be understood that crushed stone, gravel, coke or any other material may be conveyed by means of the conveyer.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. In a conveyer, the combination of a pair of carrying-wheels, a frame supported by said wheels, a horizontally extending conveyer unit extending between and projecting forwardly of said wheels, a conveyer unit projecting rearwardly of said wheels and extending upwardly at a relatively small angle, said units being connected together and supported by the frame, an endless conveyer operating in the units, and a motor and gearing for driving the endless conveyer, mounted above and supported by said upwardly extending unit.

2. In a conveyer, the combination of a pair of carrying-wheels, a frame supported by said wheels, a horizontally extending conveyer unit extending between and projecting forwardly of said wheels, a conveyer unit projecting rearwardly of said wheels and extending upwardly at a relatively small angle, said units being connected together and supported by the frame, an endless conveyer operating in the units, a housing mounted above and supported by said last mentioned conveyer unit, and mechanism disposed in said housing for driving the endless conveyer.

3. In a conveyer, the combination of a pair of carrying-wheels, a frame supported by said wheels, a horizontally extending conveyer unit extending between and projecting forwardly of said wheels, a conveyer unit projecting rearwardly of said wheels and extending upwardly at a relatively small angle, said last mentioned unit comprising sides having upwardly extending members secured thereto, the units being connected together and supported by the frame, an endless conveyer operating in said units, a housing mounted above said last mentioned unit and supported by said members, and mechanism disposed in said housing for driving the endless conveyer.

4. In a conveyer, the combination of a pair of carrying wheels, a frame supported by said wheels, a conveyer unit projecting forwardly of the wheels, a conveyer unit projecting rearwardly of said wheels and rigidly connected to said first mentioned unit, an endless conveyer operating in the units, mechanism for driving said endless conveyer, a sliding connection between the frame and the units which permits vertical adjustment for the latter, and means for raising or lowering said units with respect to the frame.

5. In a conveyer, the combination of a pair of carrying wheels, a frame supported by said wheels, a conveyer unit projecting forwardly of the wheels, a conveyer unit projecting rearwardly of said wheels and rigidly connected to said first mentioned unit, an endless conveyer operating in the units, mechanism for driving said endless conveyer a sliding connection between the frame and the units which permits vertical adjustment of the latter, and adjustable suspension means for the units.

6. In a conveyer, the combination of a pair of carrying wheels, a vertically extending frame supported by said wheels, a conveyer unit projecting forwardly of the wheels, a conveyer unit projecting rearwardly of the wheels and rigidly connected to said first mentioned unit, said last mentioned unit comprising sides, a bar structure connected to the upper ends of the sides, an endless conveyer operating in the units, mechanism for driving said endless conveyer, and means extending between the top of the frame and the bar structure for suspending the units.

7. In a conveyer, the combination of a pair of carrying wheels, a vertically extending frame supported by said wheels, a conveyer unit projecting forwardly of the wheels, a conveyer unit projecting rearwardly of the wheels and rigidly connected to said first mentioned unit, said last mentioned unit comprising sides, a bar structure connected to the upper ends of the sides, an endless conveyer operating in the units, mechanism for driving said endless conveyer, pulleys mounted on the top of the frame and on the bar structure, a cable extending around said pulleys for suspending the units, and a drum for operating the cable to raise or lower the units.

8. In a conveyer, the combination of a pair of carrying wheels, a vertically extending frame supported by said wheels, and having guide plates at its lower ends, a conveyer unit projecting forwardly of the wheels, a conveyer unit projecting rearwardly of the wheels and rigidly connected to said first mentioned unit, said last mentioned unit comprising sides, an endless conveyer operating in the units, mechanism for driving said endless conveyer, adjustable means extending between the frame and the units for supporting the latter so that they may be adjusted vertically, and shoe member carried by the sides and cooperating with the guide plates.

9. In a portable conveyer mechanism, the combination of carrying wheels, a substantially vertical frame supported by said wheels, a structure projecting rearwardly of the wheels and extending upwardly at a relatively small angle from between the frame, an endless conveyer-means carried by said structure between its sides, motor driven gearing for operating the conveyer-means, mounted above and supported by said structure, a sliding connection between the frame and said structure for permitting vertical adjustment of the latter relatively to the former, and raising and lowering means for said structure, mounted on the frame.

10. In a portable conveyer mechanism, the combination of carrying wheels, a frame supported by said wheels, a longitudinally elongated structure extending through the frame and projecting forwardly and rearwardly of the wheels, an endless conveyer-means carried by said structure between its sides and operative to carry material from one end of the structure to the other, mechanism for driving the conveyer-means, a sliding connection between the frame and structure for permitting vertical adjustment of the latter relatively to the former, and raising and lowering means for said structure, mounted on the frame.

11. In a portable conveyer mechanism, the combination of a pair of carrying wheels, a frame supported by said wheels and comprising side members and a top member, a longitudinally elongated structure extending through the frame and projecting forwardly and rearwardly of the wheels, an endless conveyer belt carried by said structure and operative to convey material from one end thereof to the other, mechanism for driving the belt, adjustable suspension means between said structure and the top member of the frame and vertical sliding connections between the sides of the structure and said side members.

Signed at Chicago, Illinois, this 24th day of March, 1927.

ARTHUR L. SHAW.